(12) United States Patent
Tucker et al.

(10) Patent No.: US 12,184,125 B2
(45) Date of Patent: Dec. 31, 2024

(54) SPOKED ROTOR HAVING DEFLECTABLE MAGNET-RETAINING SPOKES

(71) Applicant: Nidec Motor Corporation, St. Louis, MO (US)

(72) Inventors: John M. Tucker, St. Louis, MO (US); Lunjie Lu, Chesterfield, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 18/475,740

(22) Filed: Sep. 27, 2023

(65) Prior Publication Data

US 2024/0072585 A1 Feb. 29, 2024

Related U.S. Application Data

(63) Continuation of application No. 17/406,161, filed on Aug. 19, 2021, now Pat. No. 11,791,679.

(51) Int. Cl.
*H02K 1/27* (2022.01)
*H02K 1/276* (2022.01)
*H02K 21/16* (2006.01)

(52) U.S. Cl.
CPC .......... *H02K 1/2773* (2013.01); *H02K 21/16* (2013.01)

(58) Field of Classification Search
CPC ...... H02K 1/2773; H02K 21/16; H02K 1/276; H02K 1/2776; H02K 1/278; H02K 1/27; H02K 1/2706; H02K 1/2786; H02K 2213/03

USPC ...................................... 310/156.57
See application file for complete search history.

(56) References Cited

U.S. PATENT DOCUMENTS

| | | | |
|---|---|---|---|
| 9,306,422 B2 * | 4/2016 | Berkouk | H02K 1/06 |
| 9,673,671 B2 * | 6/2017 | Pan | H02K 1/2773 |
| 2010/0277017 A1 * | 11/2010 | Alexander | H02K 1/2773 29/598 |
| 2015/0035402 A1 * | 2/2015 | Reddy | H02K 21/16 310/156.01 |
| 2019/0027985 A1 * | 1/2019 | Widmer | H02K 1/28 |

\* cited by examiner

*Primary Examiner* — Daniel C Puentes
*Assistant Examiner* — Masoud Vaziri
(74) *Attorney, Agent, or Firm* — Hovey Williams LLP

(57) ABSTRACT

A rotor includes magnets and a core including arcuately arranged pole segments. Each pole segment includes first and second prongs that extend away from the rotor axis and are at least in part arcuately spaced apart to define a cutout therebetween. Each pair of arcuately adjacent pole segments defines therebetween a respective magnet-receiving slot, with the first prong of one of the pole segments and the second prong of the other of the pole segments defining the slot. The magnets are received in slots, such that each of the magnets is at least in part interposed between one of the pairs of adjacent pole segments. The magnets and the pole segments are dimensioned and configured so that at least one of the first and second prongs is deflected by the magnet received in the respective slot, such that the prongs cooperatively apply a clamping force on the magnet.

18 Claims, 14 Drawing Sheets

SPOKED ROTOR HAVING DEFLECTABLE MAGNET-RETAINING SPOKES

CROSS REFERENCE TO RELATED APPLICATION

The present application is a continuation of U.S. patent application Ser. No. 17/406,161, filed Aug. 19, 2021, the entire disclosure of which is hereby incorporated by reference herein.

BACKGROUND OF THE INVENTION

1. Field of the Invention

The present invention relates generally to a rotor for use in an electric motor.

2. Discussion of the Prior Art

Electric motors are conventionally used in applications including but not limited to heating, ventilation, and air conditioning (HVAC) systems; pumps; home appliances; and motion control. Such motors conventionally include a stator and a rotor. A variety of rotor configurations are known. In a spoked rotor configuration, a rotor core comprising a plurality of pole segments is provided. The pole segments alternate arcuately with a corresponding plurality of magnets. Various means of properly positioning and securing the magnets and the pole segments relative to one another may be implemented. For instance, high strength adhesive might be used between the rotor core and the magnets. Such adhesives are associated with several detrimental effects, however, including but not limited to increased material costs, and the presence of cure times and cleanup times. Alternatively, endcaps might be positioned at the axial faces of the rotor to trap magnets therebetween. However, such an approach is associated with increased costs and an associated increase in total parts/components. The rotor size is also increased.

SUMMARY

According to one aspect of the present invention, a rotor is provided for use in an electric motor. The rotor is rotatable about an axis. The rotor includes a plurality of magnets and a core. The core includes a plurality of pole segments arranged arcuately about the axis. Each of the pole segments includes first and second prongs that extend along a direction away from the axis and are at least in part arcuately spaced apart to define a cutout therebetween. Each pair of arcuately adjacent pole segments defines therebetween a respective magnet-receiving slot, with the first prong of one of the pole segments and the second prong of the other of the pole segments defining the magnet-receiving slot. The magnets are received in the magnet-receiving slots, such that each of the magnets is at least in part interposed between one of the pairs of adjacent pole segments. The magnets and the pole segments are dimensioned and configured so that at least one of the first and second prongs is deflected by the magnet received in the respective magnet-receiving slot, such that the prongs cooperatively apply a clamping force on the magnet.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

Figure 11A:
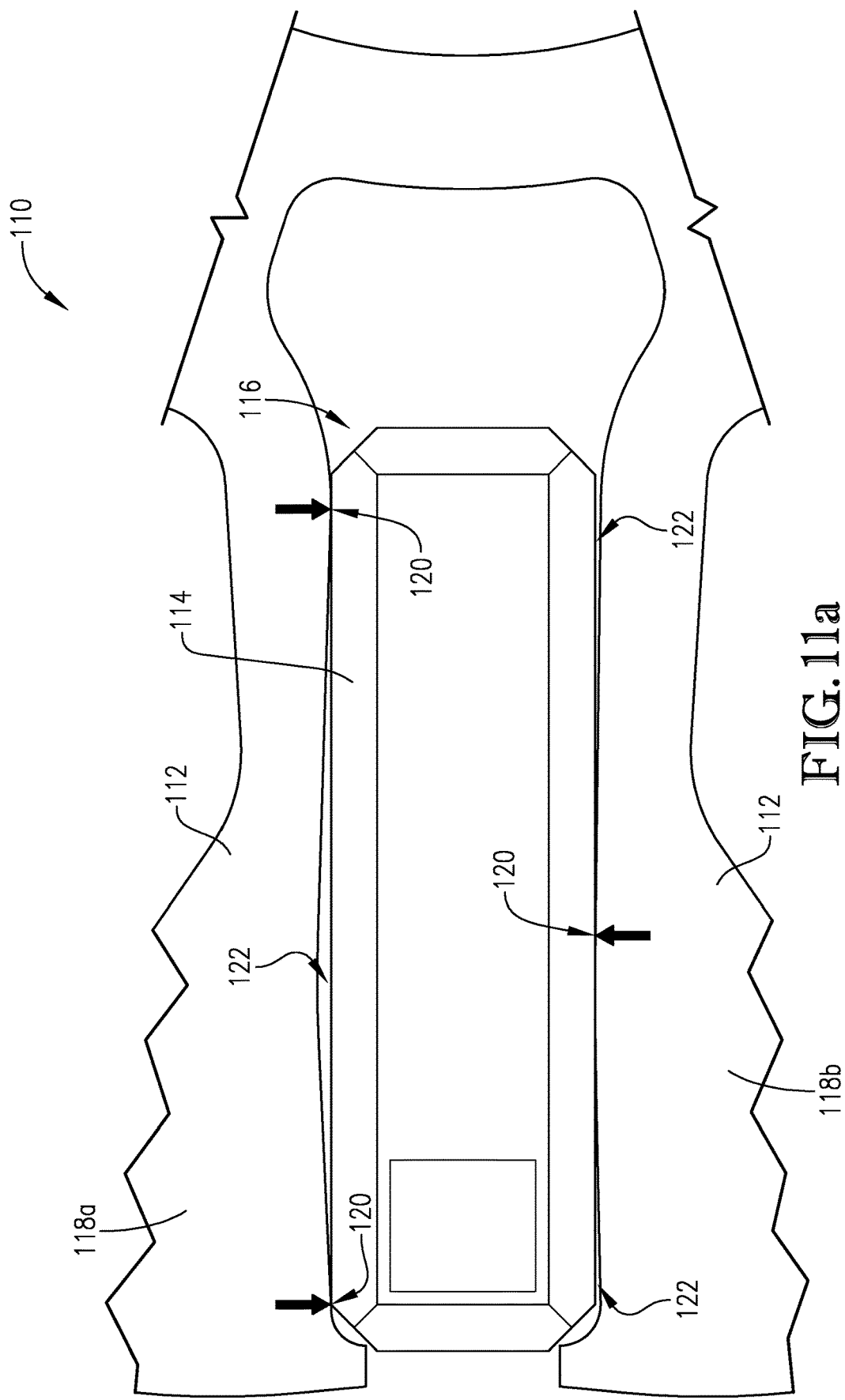
Figure 11B:
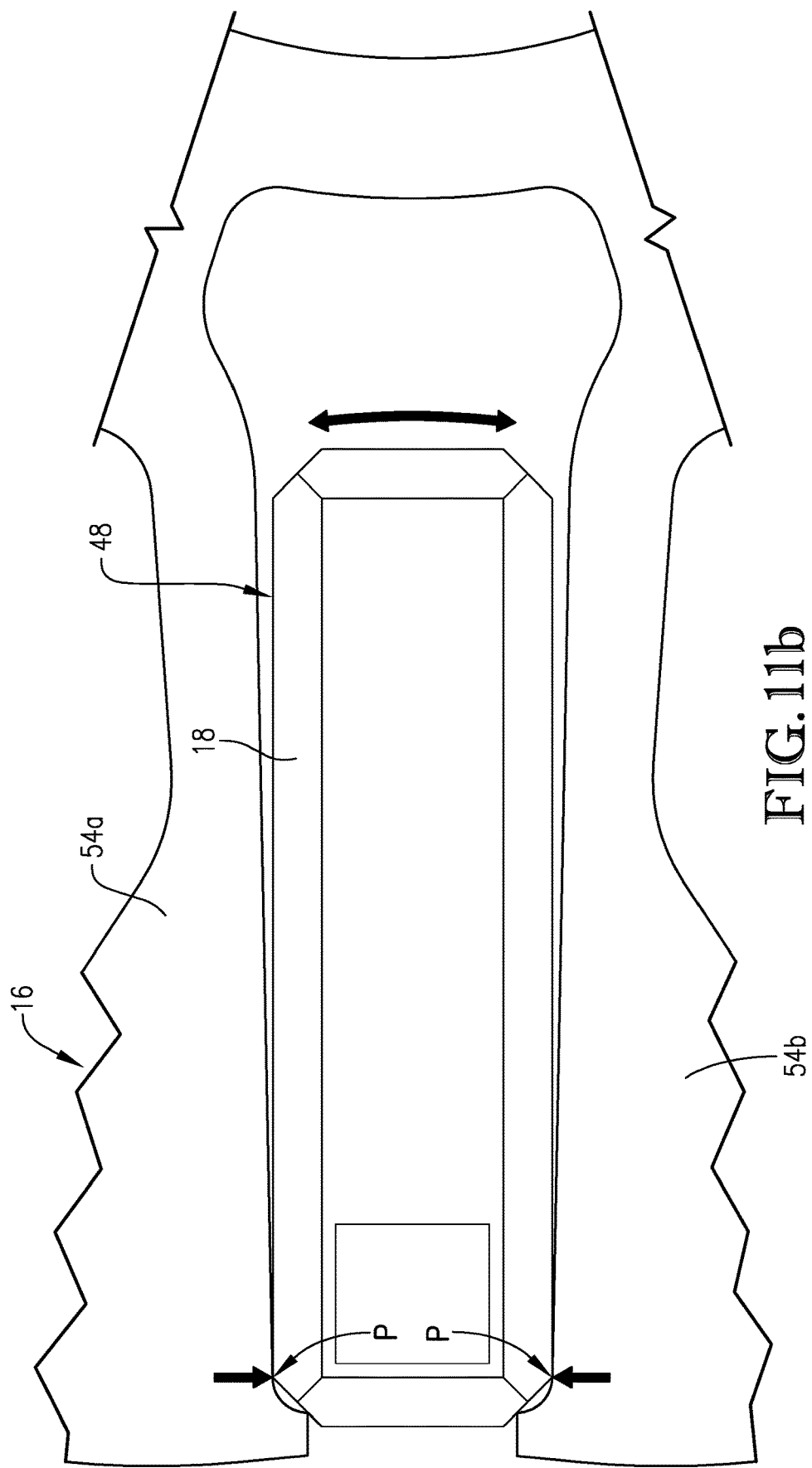
Figure 12:
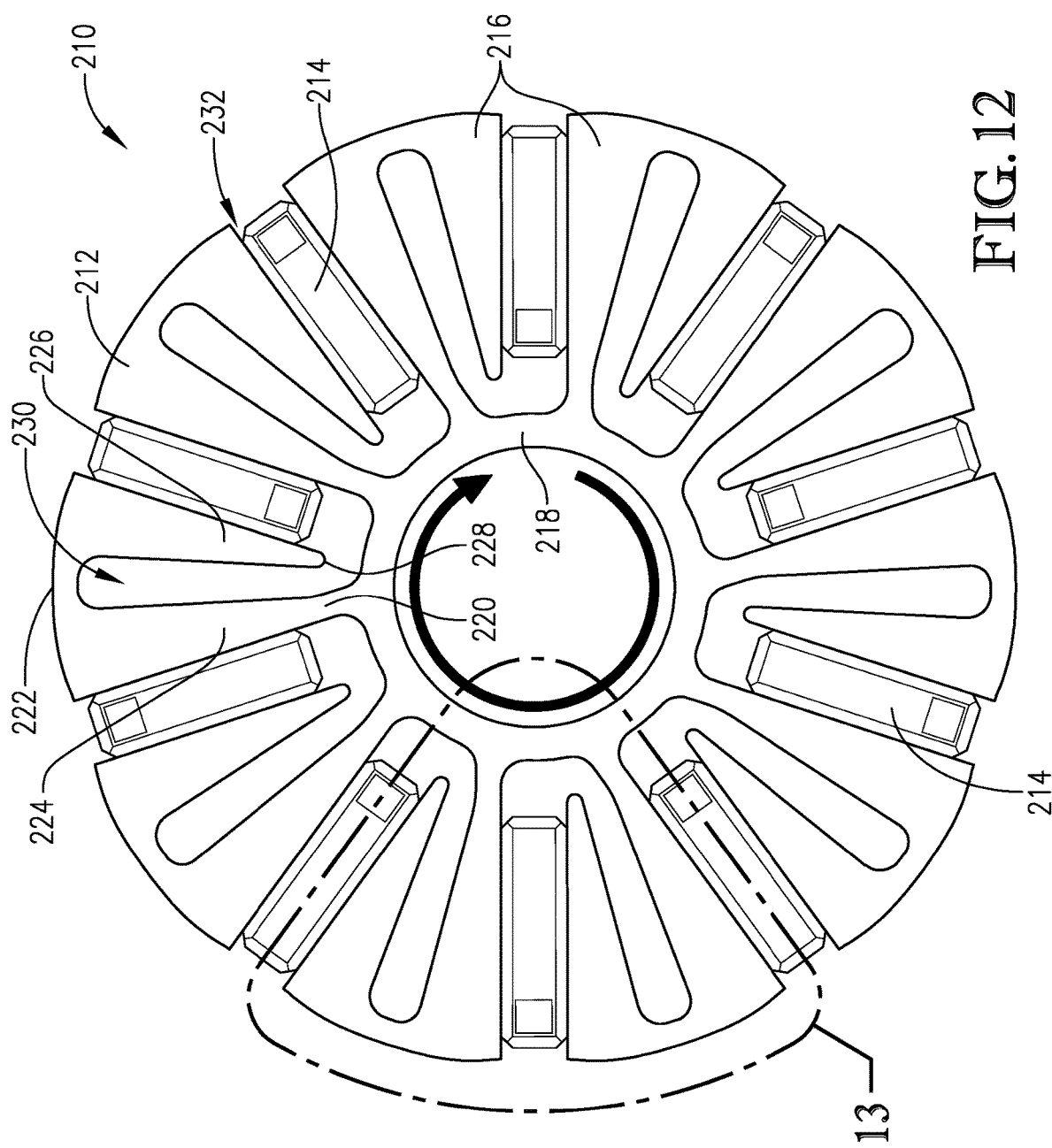
Figure 13:
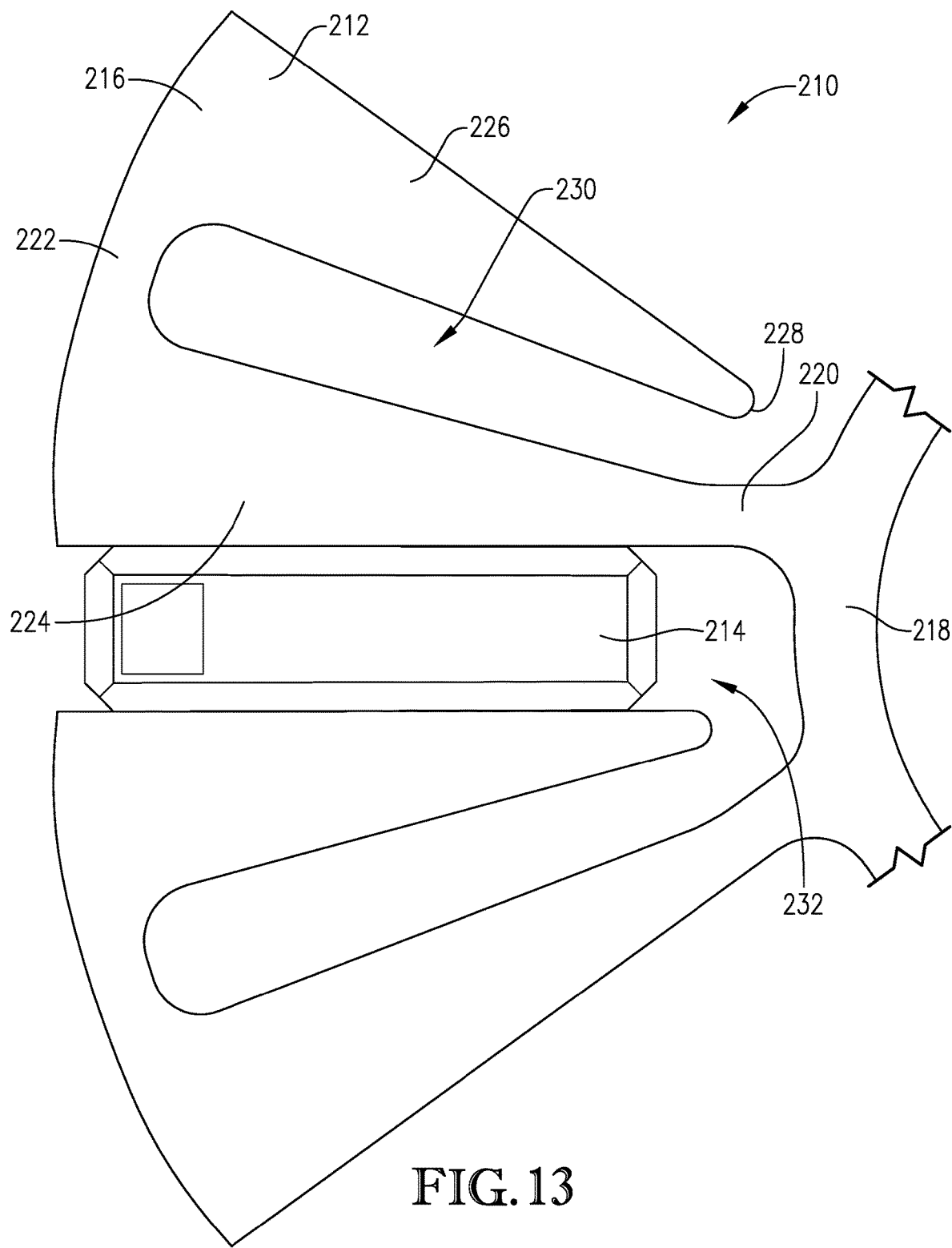

FIG. 11*a* is an enlarged, highly exaggerated view of a pair of pole segment prongs and a magnet in keeping with a second preferred embodiment of the present invention;

FIG. 11*b* is an enlarged, highly exaggerated view of a pair of pole segments prongs and a magnet of the rotor of the first preferred embodiment of the present invention, illustrated in contrast to that of FIG. 11*a*;

FIG. 12 is a top view of a rotor core and magnets in accordance with a third preferred embodiment of the present invention; and FIG. 13 is an enlarged view of a portion of the rotor core and magnets of FIG. 12.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Motor Overview

Figure 1:
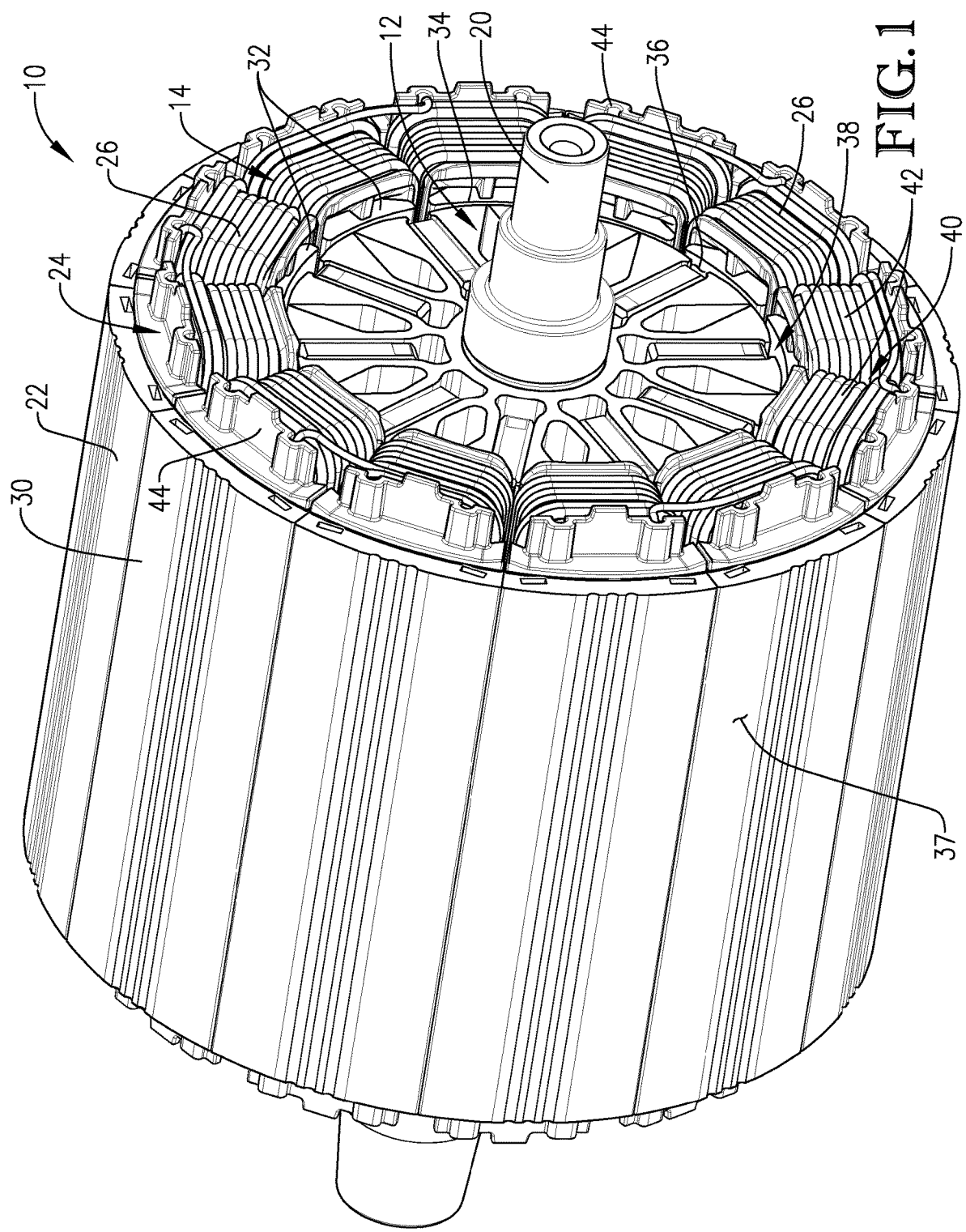
FIG. 1 is a top perspective view of a motor in accordance with a first preferred embodiment of the present invention.
Figure 2:
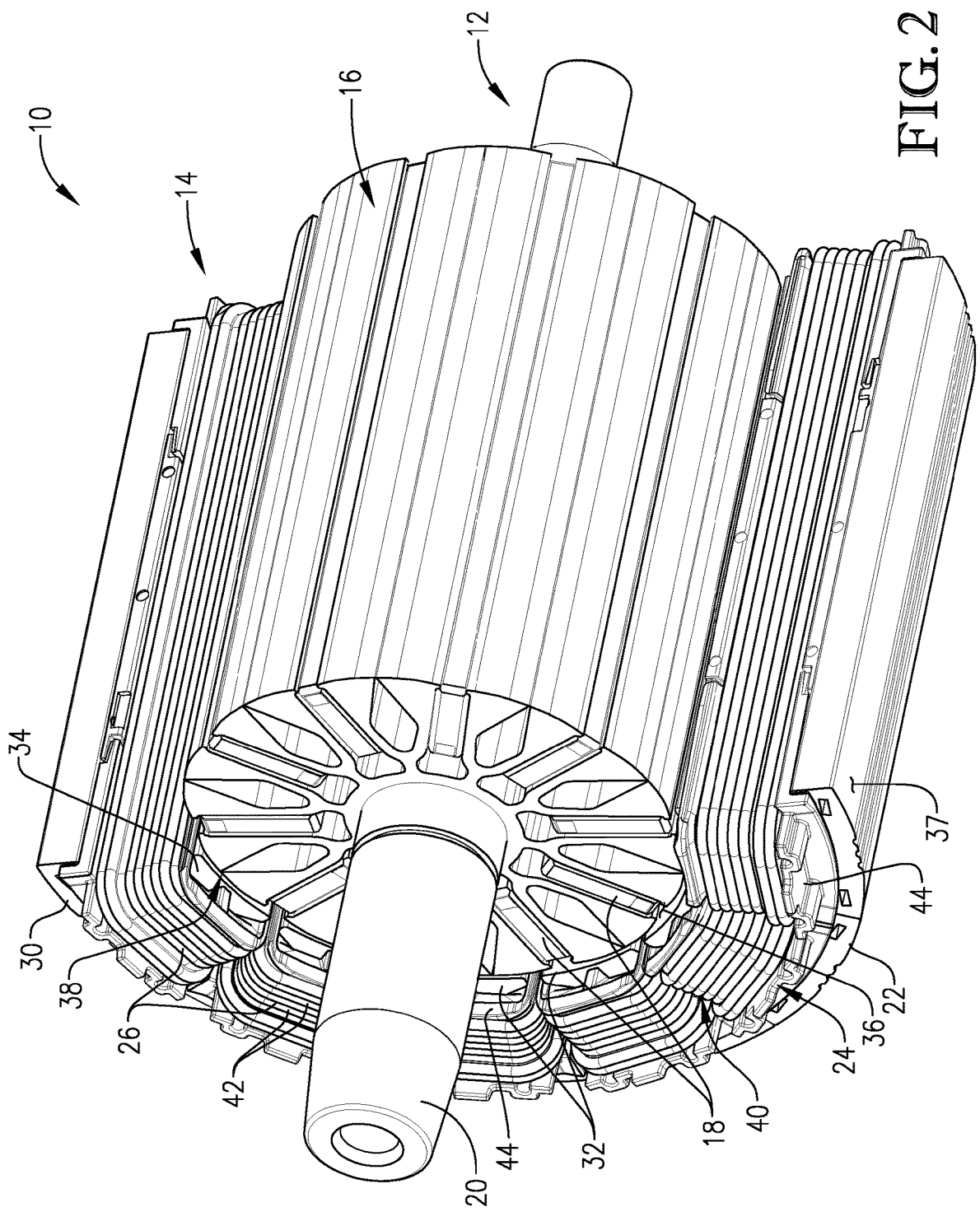
FIG. 2 is a partially sectioned bottom perspective view of the motor of FIG. 1.
Figure 3:
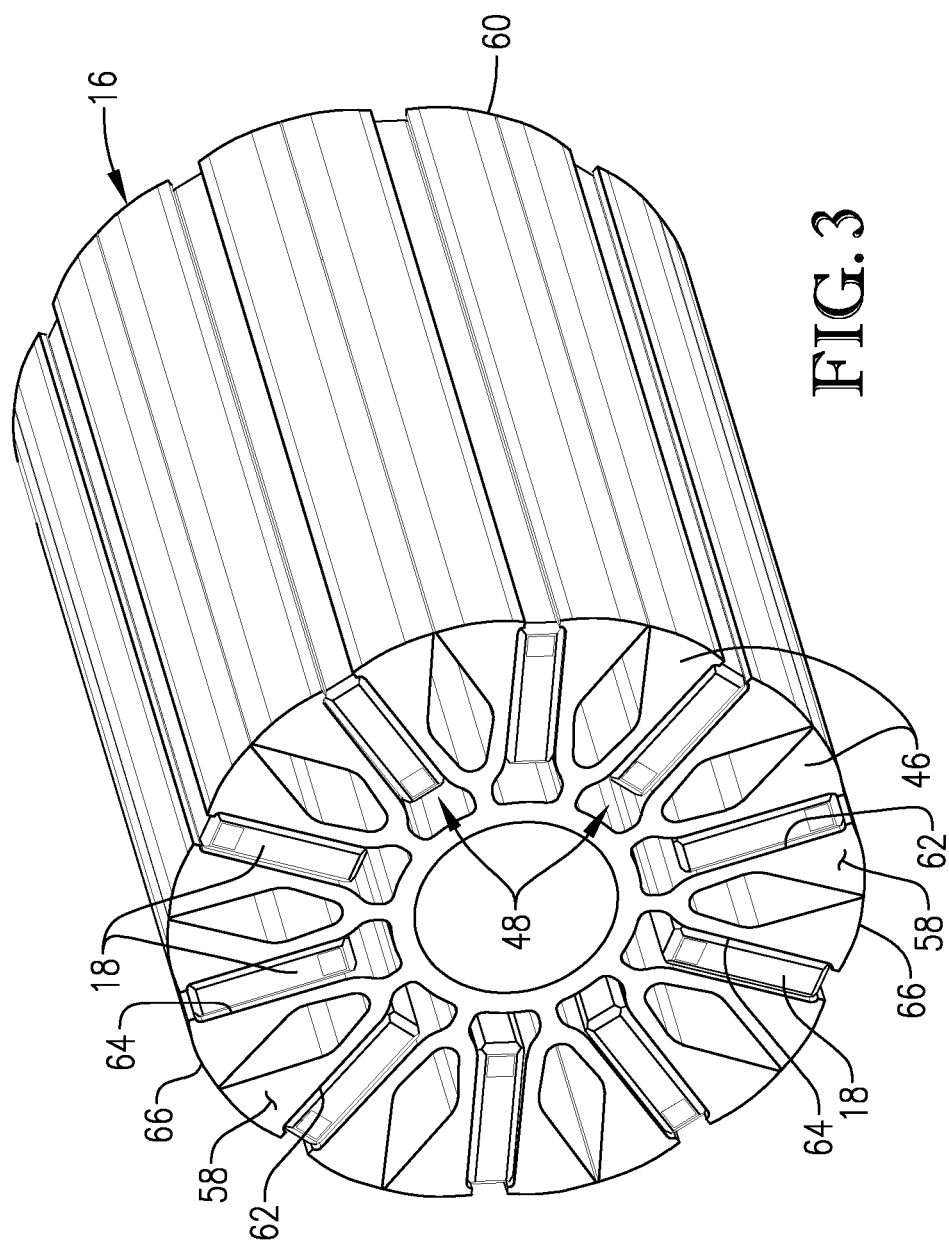
FIG. 3 is an alternative top perspective view of the rotor core and magnets of FIGS. 1 and 2.

With initial reference to FIGS. 1 and 2, an electric motor 10 is provided for use in a machine. The motor 10 broadly includes a rotor 12 and a stator 14. The rotor 12 is rotatable about an axis. In a preferred embodiment, as shown, the stator 14 at least substantially circumscribes the rotor 12, such that the motor 10 is an inner rotor motor. However, outer rotor or dual rotor motor designs fall within the scope of some aspects of the present invention.

As will be discussed in greater detail below, the rotor 12 preferably includes a rotor core 16, a plurality of magnets 18, and a shaft 20 defining a rotational axis for the rotor 12. The stator 14 preferably includes a stator core 22, an electrically insulative covering 24 on the stator core 22, and a plurality of coils 26 wound about the stator core 22.

Stator Overview

In a preferred embodiment, the stator 14 is generally toroidal in form. The stator core 22 is likewise preferably generally toroidal in form and defines an axis of the stator 14. Preferably, the axis of the stator 14 is coaxial with that of the rotor. However, it is permissible according to some aspects of the present invention for the axes to be non-coaxial.

The stator core 22 preferably includes an annular yoke 30 and a plurality of arcuately spaced apart teeth 32 extending at least generally radially inwardly from the yoke 30. The yoke 30 may be segmented, as illustrated, or arcuately continuous.

Each tooth 32 preferably includes a generally radially extending arm (not shown) and a generally arcuately extending crown 34 extending from the radially inner end of the arm to present a circumferential crown face 34a spaced opposite the yoke 30. The circumferential crown faces 34a preferably cooperatively define an inner radial surface 36 of the stator core 22.

In a preferred embodiment, the yokes 30 cooperatively present an outer radial surface 37 of the stator core 22. The outer radial surface 36 preferably defines an outer diameter of the stator 14 as a whole.

The stator core 22 preferably has an inner diameter defined by the inner radial surface 36. In a preferred inner rotor motor 10, as illustrated, such inner diameter must necessarily be larger than the outer diameter of the rotor 12. More particularly, the rotor 12 and the stator 14 preferably define a thin, circumferentially extending gap 38 therebetween.

Each pair of adjacent teeth 32 preferably defines a slot 40 therebetween. Preferably, the stator core 22 includes twelve (12) teeth 32, such that twelve (12) slots 40 are defined. However, it is permissible according to some aspects of the present invention for the number of teeth and, in turn, the number of slots, to vary.

The coils 26 preferably comprise electrically conductive wiring 42. The wiring 42 is preferably wound about each of the teeth 32 through the slots 40 to form the coils 26, with each of the coils 26 corresponding to one of the teeth 32. More particularly, the wiring 42 is preferably wound about each arm to form the coils 26.

The wiring 42 preferably comprises copper or aluminum, although any one or more of a variety of electrically conductive materials may be used without departing from the scope of the present invention.

The stator core 22 may be a laminated stator core comprising a plurality of axially stacked laminations, a solid stator core, or another form of a core without departing from the scope of the present invention.

The stator core 22 preferably comprises steel. However, it is permissible without departing from the scope of some aspects of the present invention for any one or more of a variety of suitable materials to be used for the stator core.

As noted previously, an insulative covering 24 is preferably provided on the stator core 22. The covering 24 preferably comprises an at least substantially electrically insulative material. In a preferred embodiment, for instance, the insulative covering 24 comprises a synthetic resin material. However, any one or more of a variety of substantially electrically insulative materials may be used without departing from the scope of the present invention.

In a preferred embodiment, the insulative covering 24 comprises a plurality of electrically insulative endcaps 44. However, it is noted that use of any one or more of a variety of insulation means, including but not limited to the use of electrically insulative overmolding, powder-coating, inserts, and/or liners, is permissible according to some aspects of the present invention. It is also permissible according to some aspects of the present invention for the stator core to be devoid of electrical insulation.

The wiring 42 is preferably wound about the teeth 32 on the outside of the endcaps 44, such that the wiring 42 is not in direct contact with the stator core 22 itself where the endcaps 44 are present. That is, the covering 24 preferably electrically insulates the stator core 22 from the wiring 42 and additionally provides a physical barrier between the stator core 22 and the wiring 42.

Rotor Overview

As noted previously, the rotor 12 preferably includes a rotor core 16, a plurality of magnets 18, and a shaft 20.

The rotor core 16 preferably comprises a plurality of pole segments or spokes 46 arranged arcuately about the rotor axis (or, alternatively described, about the shaft 20) to define a plurality of magnet-receiving slots 48 therebetween. Similarly, the magnets 18 are preferably arranged arcuately about the rotor axis or shaft 20. In a preferred embodiment, as illustrated, the pole segments 46 alternate arcuately with the magnets 18, such that each of the magnets 18 is at least in part interposed between adjacent pole segments 46.

The rotor core 16 further preferably includes a hub or support structure 49 circumscribing the shaft 20 and secured relative thereto to rotate therewith. The pole segments 46 preferably extend radially outwardly from or relative to the hub 49 and are integrally formed therewith. It is permissible according to some aspects of the present invention, however, for non-integral formations to be provided. For instance, the pole segments of the core might be directly or indirectly secured to or relative to a discrete hub by means of dovetails or other interlocking geometry.

Preferably, the pole segments 46 are evenly arcuately arranged. Similarly, the magnets 18 are preferably evenly arcuately arranged. Yet further, each magnet 18 is preferably centrally positioned between adjacent pole segments 46. Each magnet 18 is also preferably in direct contact with adjacent ones of the pole segments 46. It is permissible according to some aspects of the present invention, however, for uneven arrangements or variably spaced arrangements to be used.

In a preferred embodiment, each magnet 18 is preferably oriented such that its polarity is oriented generally tangentially. Furthermore, the directions of polarity of the magnets 18 are preferably alternated. More particularly, the north pole of a first one of the magnets 18 preferably faces the north pole of a neighboring second one of the magnets 18, etc. That is, each pole segment 46 preferably abuts only like poles of the adjacent magnets 18, with the pole segments 46 therefore themselves alternating in polarity. It is permissible according to some aspects of the present invention, however, for alternatively oriented and/or arranged magnets to be provided.

In a preferred embodiment, the magnets 18 are permanent magnets. Furthermore, the magnets 18 preferably comprise ferrite. However, other magnet materials (e.g., neodymium and other rare earth materials) may be used without departing from the scope of the present invention.

Preferably, ten (10) pole segments 46 and ten (10) magnets 18 are provided, such that the motor 10 is a twelve (12) slot, ten (10) pole motor. However, it is permissible according to some aspects of the present invention for other numbers of slots and poles achieving a preferred six (6) slot:five (5) pole ratio to be present. For instance, the motor might in an alternative embodiment include twenty-four (24) slots and twenty (20) poles. Yet further, the motor might instead have an entirely different slot:pole ratio (e.g., 9:10 or 3:2) and corresponding actual number of slots and poles (e.g., nine (9) slots and ten (10) poles, or twelve (12) slots and eight (8) poles) without departing from the scope of the present invention.

The rotor core 16 is preferably a laminated core, although other core types (e.g., solid or potted) are permissible provided other necessary qualities as described below are met.

Preferred methods of inserting the magnets 18 into the rotor core 16, as well as preferred mechanisms for positioning and retention of the magnets 18 within the rotor core 16, will be discussed in greater detail below.

Pole Segment and Magnet Design

In a preferred embodiment, each pole segment 46 includes a main body 50 and a stem 52. The stem 52 preferably extends between and interconnects the main body 50 and the hub 49.

Each main body 50 includes a first prong 54a and a second prong 54b. Each of the prongs 54a and 54b extends at least substantially radially away from the axis. Furthermore, the prongs 54a and 54b of each pole segment 46 are arcuately spaced apart from one another to define a cutout 56 therebetween.

Each pole segment 46 includes axially spaced apart top and bottom faces 58 and 60, respectively; arcuately spaced apart side faces 62 and 64 extending between and interconnecting the top and bottom faces 58 and 60; and a circumferential outer face 66 that extends between and interconnects the top, bottom, and side faces 58, 60, 62, and 64. The prongs 54a and 54b of each pole segment cooperatively at least in part present the top and bottom faces 58 and 60, as well as the outer face 66. The prong 54a presents or at least substantially presents the side face 62, and the prong 54b presents or at least substantially presents the side face 64.

In a preferred embodiment, each pole segment 46 further preferably includes a pair of ears or tabs 68a and 68b (see FIGS. 6, 8, and 9) each extending generally arcuately outwardly from the main body 50 in opposition to each other. More particularly, each ear 68a extends from the side face 62 defined by a corresponding one of the prongs 54a. Each ear 68b extends from the side face 64 defined by a corresponding one of the prongs 54b. The ear 68a of a first one of the pole segments 46 thus extends toward the ear 68b of an adjacent one of the pole segments 46, with the ears 68a and 68b thus in part defining the corresponding magnet slot 48.

Figure 6:
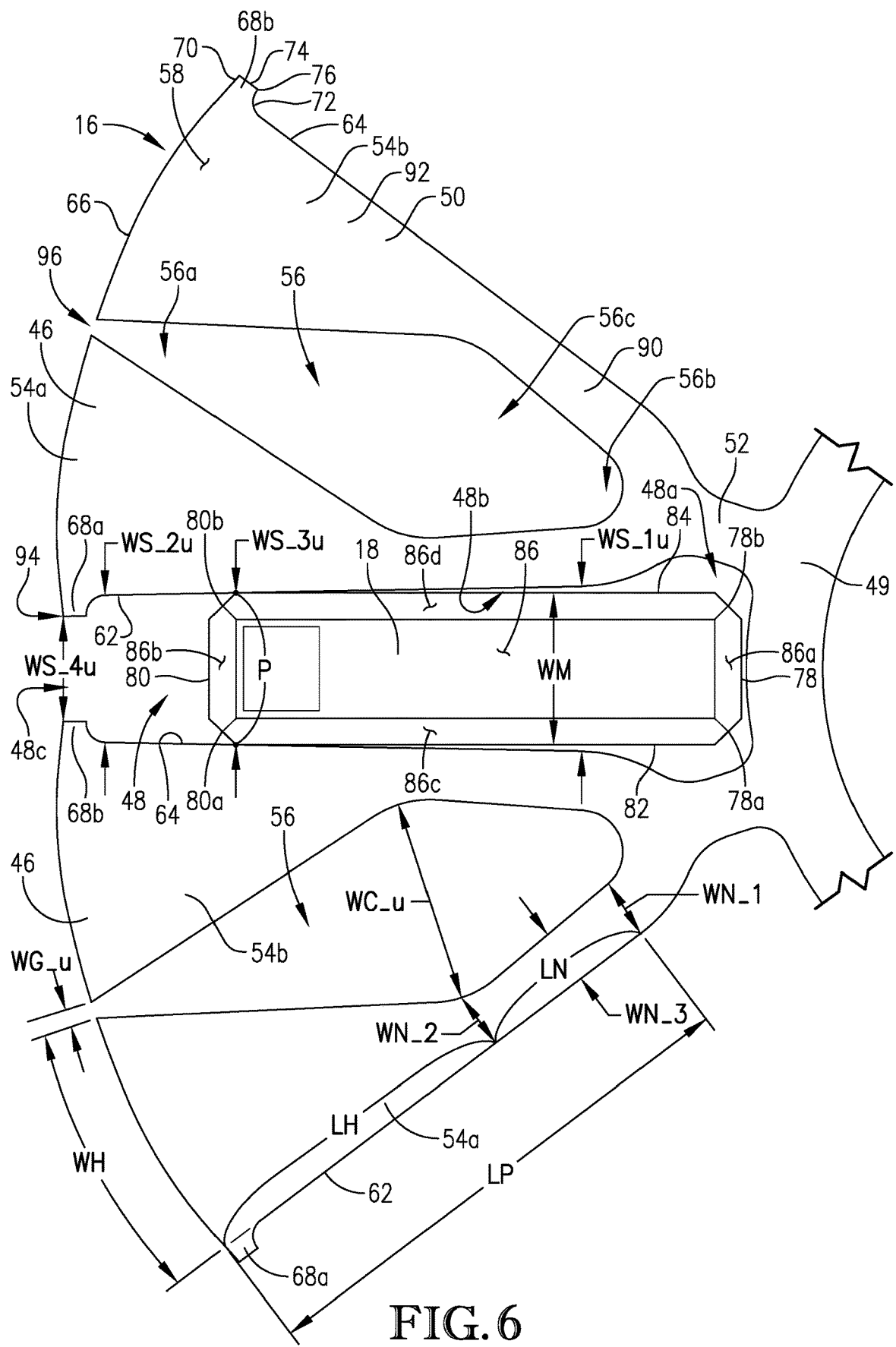
FIG. 6 is an enlarged view of a portion of the rotor core and magnets of FIG. 5.
Figure 7:
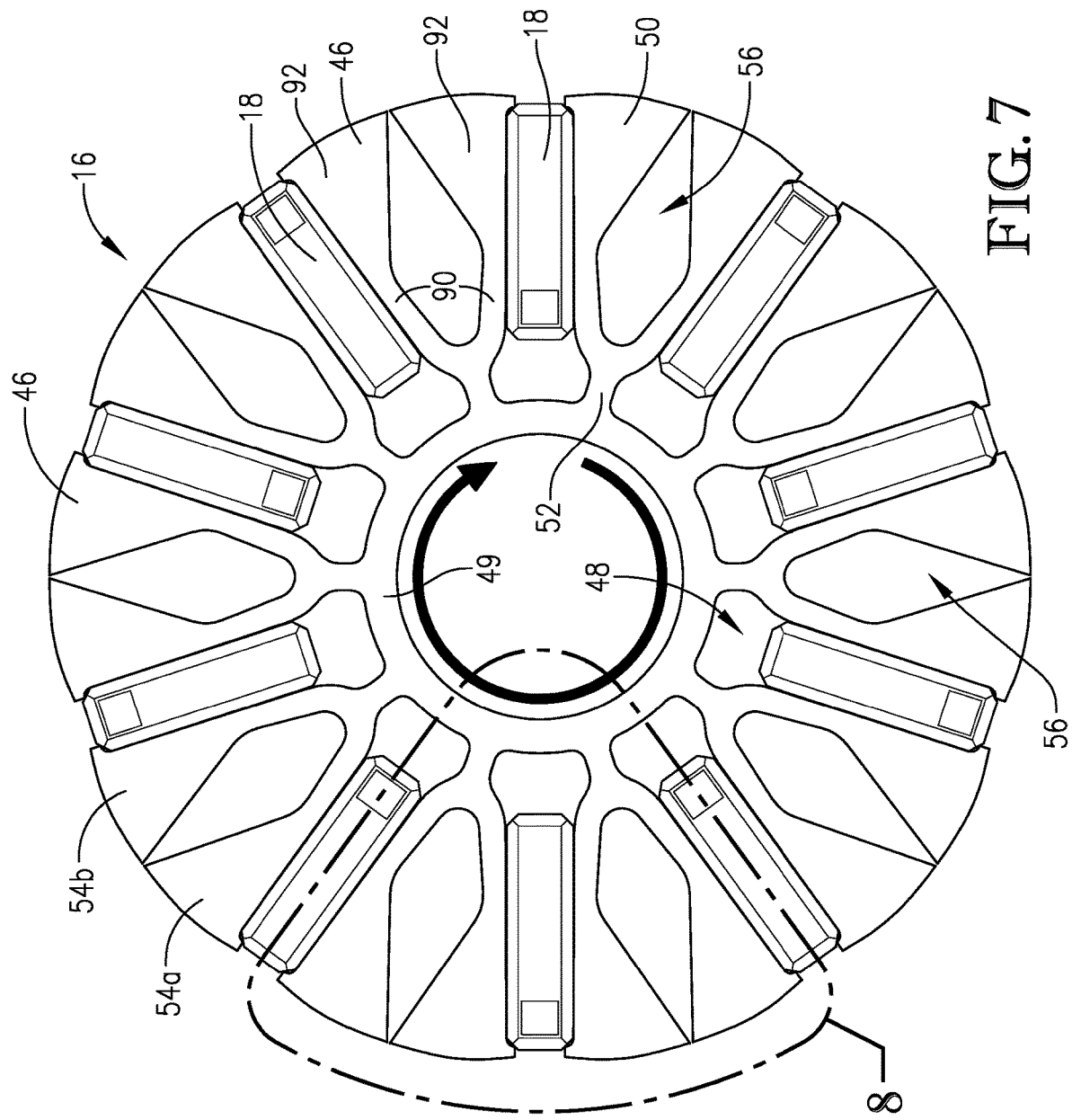
FIG. 7 is a top view of the rotor core and magnets similar to FIG. 5, but with the magnets in a final radially outer position and the pole segment prongs in a final deflected state.
Figure 8:
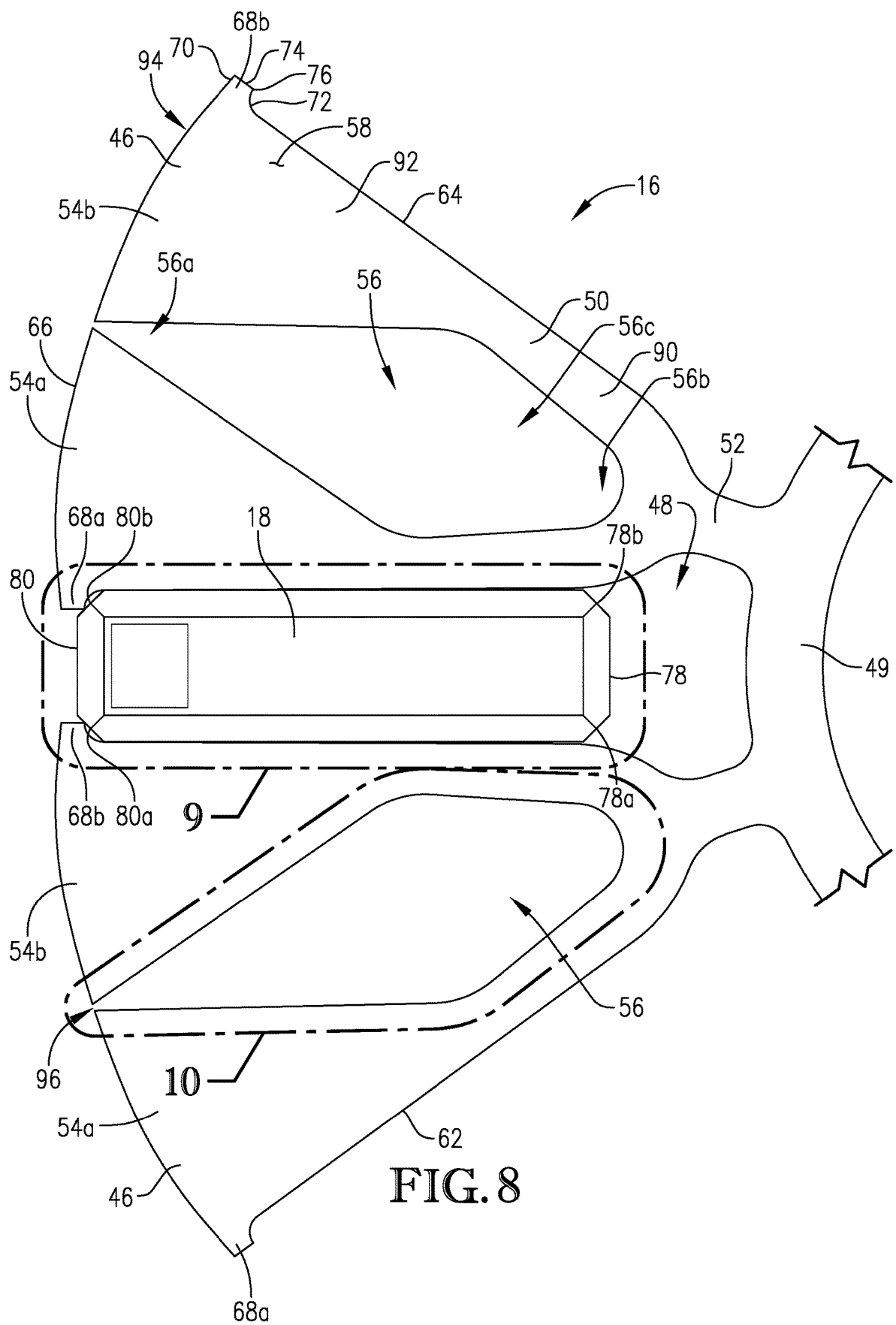
FIG. 8 is an enlarged view of a portion of the rotor core and magnets of FIG. 7.
Figure 9:
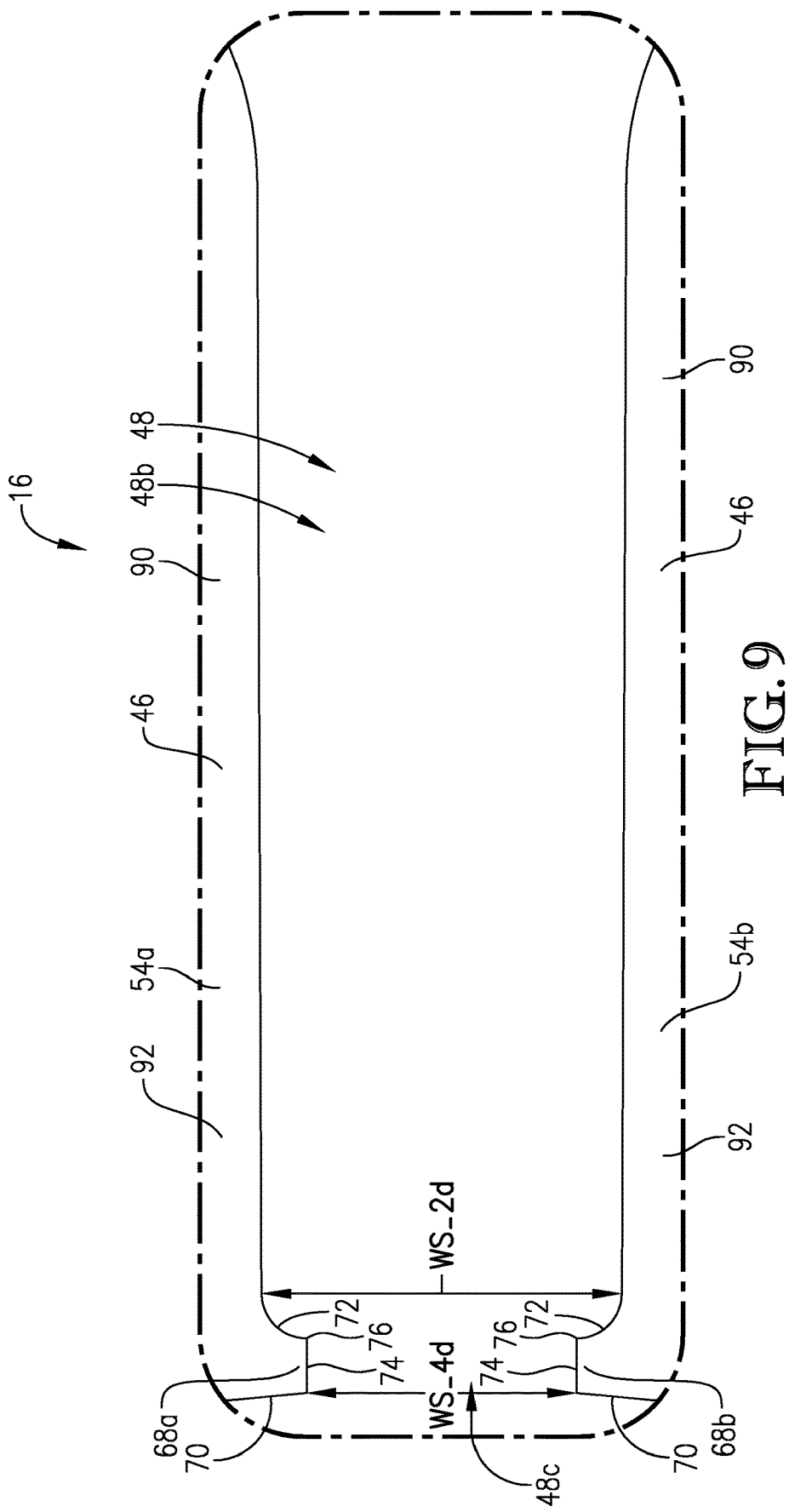
FIG. 9 is an enlarged view of a portion of FIG. 8, with the magnet removed, particularly illustrating the magnet-receiving slot.

As best shown in FIGS. 6, 8, and 9, each ear 68a, 68b preferably presents a radially outermost ear face 70 that forms a portion of the aforementioned radially outermost face 66 of the respective one of the pole segments 46. Each ear 68a, 68b also presents a radially innermost ear face 72 disposed radially inwardly of the radially outermost ear face 70 and extending directly from a corresponding one of the side faces 62 or 64 of the main body 50. The radially innermost ear face 72 may be curved, as illustrated, although straight, partially curved, chamfered, and/or other configurations fall within the scope of the present invention.

The ears 68a, 68b also preferably present a tip face 74 spaced generally arcuately from the main body 50 and extending between and interconnecting the corresponding radially outermost ear face 70 and radially innermost ear face 72. An inner corner 76 (see FIGS. 6, 8, and 9) is formed by each ear 68a, 68b at the intersection of the radially innermost ear face 72 and the tip face 74.

As noted previously, adjacent ones of the pole segments 46 define magnet-receiving slots 48 therebetween. More particularly, the first prong 54a, the first ear 68a, and the stem 52 of a first one of the pole segments 46 cooperates with the adjacent second prong 54b, second ear 68b, and stem 52 of an adjacent one of the pole segments 46 to define therebetween a respective one of the magnet-receiving slots 48. Alternatively stated, the first prong 54a and the second prong 54b, the first ear 68a and the second ear 68b, and the stems 52 of a given pair of arcuately adjacent pole segments 46 define therebetween the respective magnet-receiving slot 48.

As will be apparent from the above, the magnet-receiving slot 48 includes a radially inner base portion 48a adjacent and defined primarily by the hub 49 and the stems 52, a main portion 48b defined by the corresponding prongs 54a and 54b, and a radially outer tip portion 48c defined by the ears 68a and 68b.

As briefly noted above, each magnet 18 is received in a respective one of the magnet-receiving slots 48, such that each of the magnets 18 is at least in part interposed between one of the pairs of adjacent pole segments 46.

Figure 4:
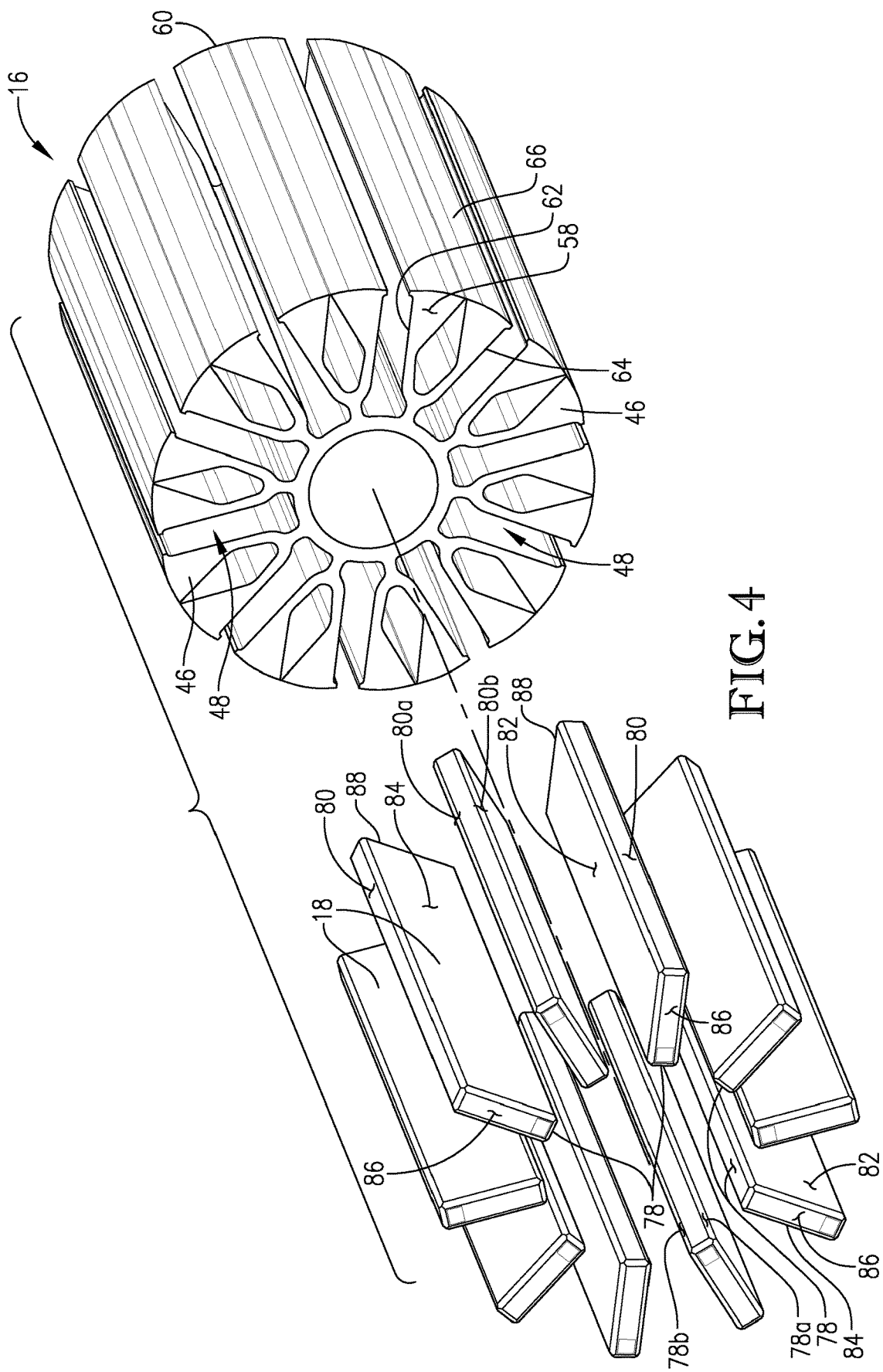
FIG. 4 is an exploded top perspective view of the rotor core and magnets of FIGS. 1-3.

Preferably, each magnet 18 is preferably generally cuboidal in form. More particularly, as best shown in FIG. 4, each magnet 18 preferably presents a radially innermost face 78, a radially outermost face 80, a pair of circumferentially spaced apart side faces 82 and 84, and axially spaced apart upper and lower faces 86 and 88. The faces 78, 80, 82, 84, 86, and 88 are preferably at least substantially flat and arranged in a cuboidal manner. Chamfered top edges 86a-d (see FIG. 6) preferably extend between and interconnect the top or upper face 86 to respective ones of the innermost and outermost faces 78 and 80 and the side faces 82 and 84. Similarly, chamfered bottom edges (not labeled) preferably extend between and interconnect the bottom or lower face 88 to respective ones of the innermost and outermost faces 78 and 80 and the side faces 82 and 84. Chamfered corner faces 78a and 78b (FIGS. 4, 6, and 8) extend between and interconnect the innermost face 78 to respective ones of the side faces 82 and 84, and chamfered corner faces 80a and 80b (FIGS. 4, 6, and 8) extend between and interconnect the outermost face 80 to respective ones of the side faces 82 and 84. It is permissible according to some aspects of the present invention, however, for the magnet shapes to vary (e.g., via the omission of chamfered edges, the provision of one or more curved faces and/or non-orthogonal orientation of the main faces, etc.).

In a fully assembled form of the rotor 12, the radially innermost face 78 of each magnet 18 is preferably spaced from the hub 49 such that the base portion 48*a* of the slot 48 is unobstructed by the magnet 18. The radially outer corner faces 80*a* and 80*b* preferably engage the corners 76 of the corresponding ears 68*b* and 68*a*, with the ears 68*b* and 68*a* thereby restricting radially outward shifting of the respective magnet 18. Furthermore, the radially outer face 80 of the given magnet 18 is thus disposed in the radially outer tip portion 48*c* of the slot 48, with the tip portion 48*a* being otherwise unobstructed by the magnet 18.

Rotor Assembly and Magnet Retention

In a preferred embodiment, the magnets 18 and the pole segments 46 are dimensioned and configured so that adjacent first and second prongs 54*a* and 54*b* of adjacent pole segments 46 are deflected by the magnet 18 received in the respective magnet-receiving slot 48 therebetween, with the first and second prongs 54*a* and 54*b* applying a clamping force on the magnet 18.

More particularly, as shown in FIG. 4, prior to assembly of the rotor 12 (or, more particularly, prior to insertion of the magnets 18 into the rotor core 16), the rotor core 16 is in an undeflected state in which the prongs 54*a* and 54*b* of each pole segment 46 are neither subject to forces from the magnets 18 nor generators of forces onto the magnets 18. Most preferably, the prongs 54*a* and 54*b* are neither subject to forces from nor generators of forces onto any other rotor components.

Figure 5:
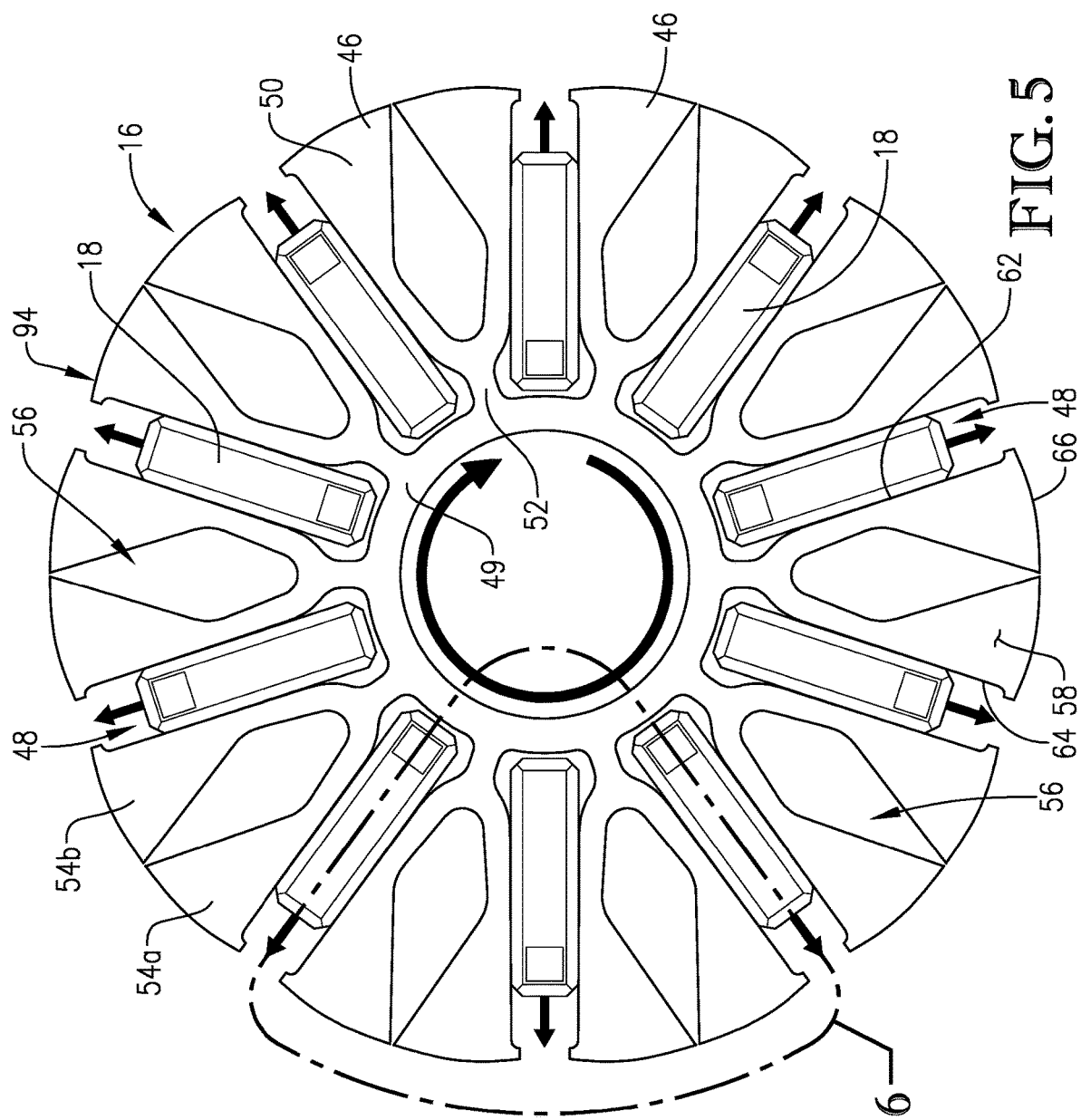
FIG. 5 is an enlarged top view of the rotor core and magnets of FIGS. 1-4, with the magnets in an initial radially inner position and the pole segment prongs in an initial undeflected state.

In a preferred method of assembly, the magnets 18 are inserted axially into corresponding ones of the slots 48. More particularly, as shown in FIGS. 5 and 6, the magnets 18 are initially inserted into a radially inner portion of the slots 48 (i.e., into the base portion 48*a* and a radially inner portion of the main portion 48*b*). As best shown in FIG. 6, the rotor core 16 most preferably remains in an undeflected state, even after initial axial insertion of the magnets 18, due to the enlarged size and shape of the inner portions of the undeflected slots 48 relative to the magnet 18. It is permissible according to some aspects of the present invention, however, for a small amount or even a significant amount of deflection to occur even upon initial axial insertion of the magnets 18.

In greater detail, in the undeflected state, the slots 48 taper (i.e., become narrower) in a radially outward direction. That is, as shown in FIG. 6, a first undeflected tangential slot width WS_1*u* at the radially inner end of the main slot portion 48*b* is greater than a second undeflected tangential width WS_2*u* at the radially outer end of the main slot portion 48*b* when the rotor core 16 is in the undeflected state. Each magnet 18 preferably has a constant width WM. As is readily apparent from FIG. 6, the magnet width WM is preferably less than the undeflected inner slot width WS_1*u* but greater than the undeflected outer slot width WS_2*u*. The magnet width WM is preferably equal to an intermediate undeflected slot width WS_3*u* that corresponds positionally with a pair of initial contact points P between the given magnet 18 and the adjacent pole segment prongs 54*a* and 54*b*.

An additional undeflected tangential slot width WS_4*u* is defined between the adjacent ears or tips 68*a* and 68*b* of adjacent ones of the pole segments 46 at the outermost faces 70 thereof (i.e., at the tip portion 48*c* of the slot 48) and is smaller than each of the other slot widths WS_1*u*, WS_2*u*, and WS_3*u*, as well as the magnet width WM.

The base portion 48*a* of each slot 48 is sized and shaped as to readily accommodate the corresponding magnet 18 without tangential or arcuate contact therewith. (That is, the base portion 48*a* is enlarged relative to the remainder of the slot 48 and relative to the magnet 18.) Contact between the magnet 18 and the hub 49 is permissible, however, although not required.

After the magnets 18 are inserted into the radially inner portions of the slots 48, they are preferably thereafter shifted radially outwardly into the final positions shown in FIGS. 1-3, 7, and 8. Such shifting is accomplished only upon application of sufficient force by the magnets 18 to cause deflection of the prongs 54*a* and 54*b* and accompanying expansion of the radially outer portions of the slot 48 (including the tip portion 48*c* and outer portions of the main slot portion 48*b*).

Figure 10:
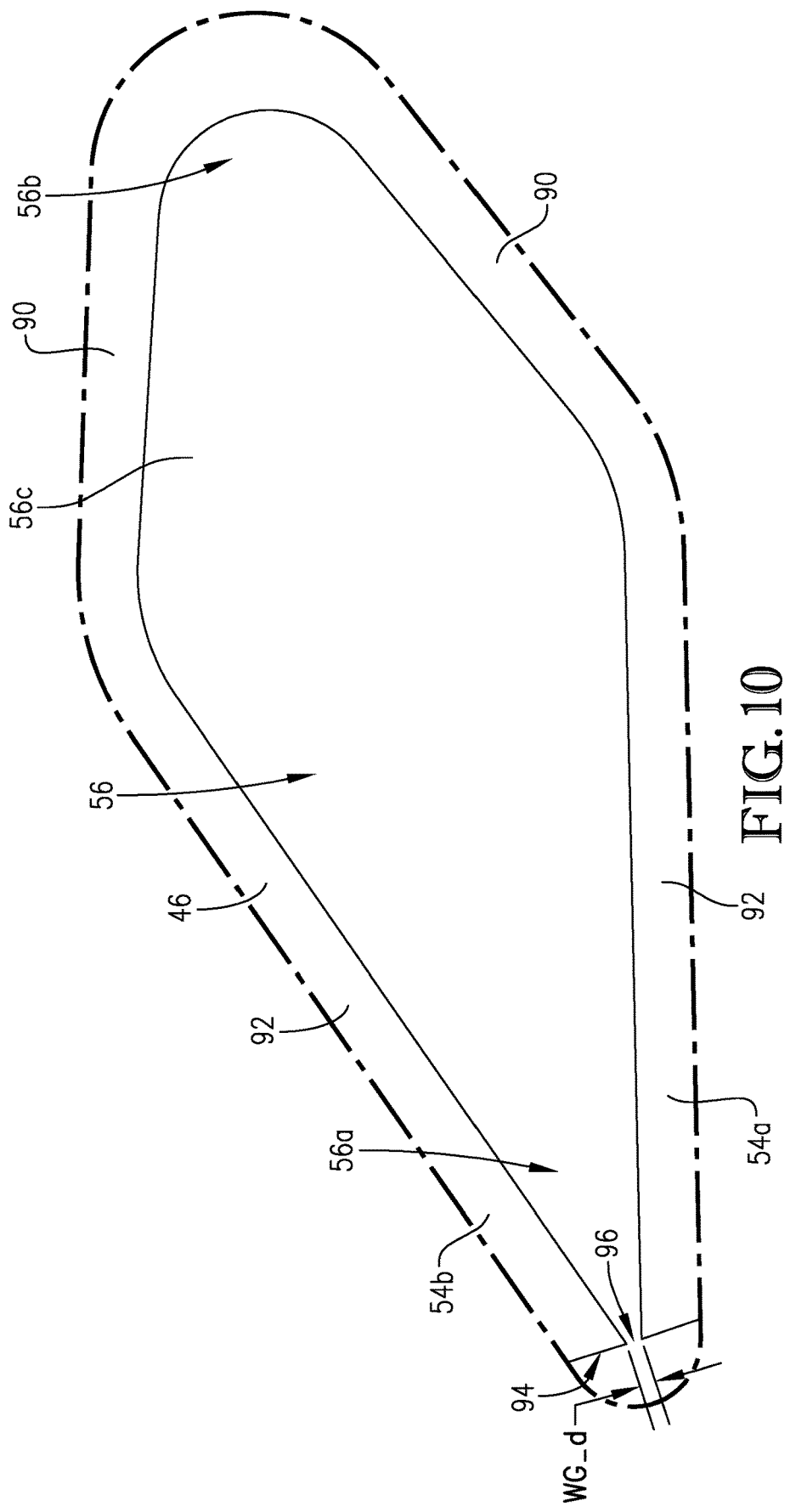
FIG. 10 is an enlarged view of a second portion of FIG. 8, particularly illustrating the cutout.

More particularly, as best shown in FIGS. 8-10 (which show the deflected or final state of the rotor core 16 in solid lines and the undeflected or initial state in dashed lines), in the deflected state of the rotor core 16, a radially outer deflected slot width WS_2*d* is equal to the magnet width WM (and thus greater than its corresponding undeflected slot width W2_2*u*), and a deflected slot width WS_4*d* between the ears 68*b* and 68*a* is greater than the undeflected slot width WS_4*u*. That is, the slot 48 has been forced by the magnet 18 to widen at its radially outer portions so as to accommodate the magnet 18 therein.

Furthermore, the base portion 48*a* of each slot 48 is unobstructed by the magnet 18, whereas the main portion 48*b* is at least substantially filled by the corresponding magnet 18.

In a preferred embodiment, the rotor core 16 is configured such that the pole segments 46 and, more particularly, the prongs 54*a* and 54*b* are at least substantially resiliently deflectable. That is, upon hypothetical removal of the magnets 18, the prongs 54*a* and 54*b* would return or at least substantially return to their original undeflected positions. Such resilience is achieved at least in part through appropriate dimensioning of the prongs 54*a* and 54*b*, appropriate selection of the rotor core 16 material, and appropriate dimensioning of the magnets 18. Dimensioning and material selection are also preferably done with flux considerations in mind, as well. Alternatively stated, the prongs 54*a* and 54*b* should be dimensioned and configured both geometrically and in terms of material composition so as to be sufficiently flexible (i.e., sufficiently ductile and not overly brittle) while also maintaining sufficient flux flow capabilities.

With particular regard to desired deflection properties, the above-referenced variables should be chosen such that the prongs experience primarily or exclusively elastic deformation, with the stresses associated with deflection remaining below or only slightly above the yield strength of the chosen material. In such an instance, an at least substantially tangential resultant spring or clamping force will be applied by the prongs 54*a* and 54*b* to the magnet 18 therebetween as the prongs 54*a* and 54*b* essentially attempt to return elastically to their undeflected state or very near thereto. Such spring force or clamping force should be great enough to restrict shifting of the respective magnet 18 within the magnet-receiving slot 48.

In a practical sense, it is noted that such clamping force is preferably large enough to enable the rotor 12 to be devoid of adhesive, glue, over-molding, caps, and/or other magnet-retention means, as illustrated. It is permissible according to some aspects of the present invention, however, for such means to nevertheless be provided.

In a preferred embodiment of the present invention a small amount of plastic deformation may also occur. Such deformation, if it occurs, is most preferably primarily for purposes of tolerance absorption.

As will be apparent to those of ordinary skill in the art, the clamping force results in a final radial static friction force between the prongs 54a and 54b and associated magnets 18, with such force being inherently proportional to the coefficient of static friction between the prongs 54a and 54b and the corresponding magnets 18. The static friction force and the clamping force cooperatively at least substantially retain the magnets 18 in position between the adjacent prongs 54b and 54a.

It is particularly noted that the final static friction force is preferably greater than both an initial static friction force and the intermediate kinetic friction forces that must be overcome during insertion of the magnets 18 as they are shifted from their initial radially inner positions to their final radially outer positions.

In a preferred embodiment, the rotor core 16 comprises steel, although other materials having appropriate magnetic performance characteristics and yield strengths may be used.

Preferably, each prong 54a and 54b includes a radially inner neck 90 extending from the corresponding stem 52 and an enlarged head 92 extending from a radially outer end of the neck 90. The aforementioned ears 68a and 68b extend from corresponding ones of the heads 92. As will be apparent to those of ordinary skill in the art, dimensioning and shaping of the necks 90 is particularly critical to achieving the aforementioned balance of flexibility and flux flow accommodation.

Each neck 90 is preferably at least substantially straight so as to be generally rectangular in cross-section, although a slight taper in the radially outward direction is most preferred. Each neck 90 also preferably extends generally radially outward, with the exact direction of extent varying depending on the deflection state of the corresponding prong 54a or 54b.

Each neck 90 preferably has a width WN_1 (FIG. 6) in a tangential direction at an inner end thereof between about twenty thousandths (0.020) inches and one hundred thousandths (0.100) inches, more preferably between about forty thousandths (0.040) inches and eighty thousandths (0.080) inches, and most preferably about sixty-two thousandths (0.062) inches.

Each neck 90 preferably has a width WN_2 (FIG. 6) in a tangential direction at an outer end thereof between about ten thousandths (0.010) inches and ninety thousandths (0.090) inches, more preferably between about thirty thousandths (0.030) inches and seventy thousandths (0.070) inches, and most preferably about five hundred thirty-nine thousandths (0.539) inches.

Each neck 90 preferably presents a radial average or intermediate width WN_3 (FIG. 6) in a tangential direction at a generally radial midpoint thereof between about fifteen thousandths (0.015) inches and ninety-five thousandths (0.095) inches, more preferably between about thirty-five thousandths (0.035) inches and seventy-five thousandths (0.075) inches, and most preferably about fifty-eight thousandths (0.058) inches.

Each neck 90 preferably has a length LN (FIG. 6) between about seventy thousandths (0.070) inches and two hundred seventy thousandths (0.270) inches, more preferably between about one hundred twenty thousandths (0.120) inches and two hundred twenty thousandths (0.220) inches, and most preferably about one hundred seventy thousandths (0.170) inches.

The length LN is preferably between about one and a half (1.5) times and about four and a half (4.5) times the average width WN_3, more preferably between about two (2) times and about four (4) times the width WN_3, and most preferably about two and ninety-three hundredths (2.93) times the width WN_3.

The heads 92 each broaden or flare outwardly from the radially outer end of the corresponding neck 90 to present a present a generally triangular cross-section, with the outer sides thereof (i.e., along the outer face 66 of the corresponding pole segment 46) being curved.

The heads 92 thus present a broadest arcuate width WH (FIG. 6) along the radially outer face 66 of the corresponding pole segment 46. The arcuate width WH is preferably between about one hundred thousandths (0.100) inches and five hundred thousandths (0.500) inches, more preferably between about two hundred thousandths (0.200) inches and four hundred thousandths (0.400) inches, and most preferably about two hundred seventy-six thousandths (0.276) inches.

The heads 92 present a length LH (FIG. 6) that is preferably between about one hundred fifty thousandths (0.150) inches and five hundred thousandths (0.500) inches, more preferably between about two hundred fifty thousandths (0.250) inches and four hundred thousandths (0.400) inches, and most preferably about three hundred sixty-seven thousandths (0.367) inches.

The length LH is preferably between about five tenths (0.5) times and about two (2) times the width WH, more preferably between about one (1) time and about one and a half (1.5) times the width WH, and is most preferably about one and three tenths (1.3) times the width WH.

Each prong 46 as a whole, including the respective neck 90 and head 92, preferably has a length LP (FIG. 6) between about two hundred thousandths (0.200) inches and eight hundred thousandths (0.800) inches, more preferably between about four hundred thousandths (0.400) inches and six hundred thousandths (0.600) inches, and most preferably about five hundred thirty-seven thousandths (0.537) inches.

The prong length LP is preferably between about one and a half (1.5) times and about five (5) times the neck length LN, more preferably between about two (2) times and about four (4) times the length LN, and most preferably about three and sixteen hundredths (3.16) times the length LN.

The length LP is preferably between about five (5) times and about fifteen (15) times the neck width WN, more preferably between about seven and a half (7.5) times and about twelve (12) times the WN, and most preferably about nine and ninety-six hundredths (9.96) times the width WN.

The pole segments 46 may alternatively be characterized based on the definition of the cutout 56 therein. As noted previously, the first and second prongs 54a and 54b of a given pole segment 46 are at least in part arcuately spaced apart to define the cutout 56 therebetween. As best shown in FIGS. 6, 8, and 10, in correspondence with the previously described preferred shapes of the prongs 54a and 54b, each of the cutouts 56 is generally teardrop shaped, including a radially inwardly expanding, generally triangular top or outer portion 56a intersecting a radial outer margin 94 of the rotor core 16 such that a cutout gap 96 is defined between the prongs 54a and 54b at the margin 94; a concave outward base or inner portion 56b spaced radially inwardly from the top portion 56a; and a radially inwardly contracting, generally trapezoidal intermediate portion 56c extending between and interconnecting the top portion 56a and the base portion 56b.

The cutouts 56 accommodate the previously discussed deflection of the prongs 54a and 54b toward each other. More particularly, the tangential width of the cutout 56 along the radial length thereof decreases as the prongs 54a and 54b deflect toward one another (i.e., as the magnets 18 are pushed radially outward into their final positions).

For instance, in the undeflected state of a given one of the pole segments 46, the cutout gap 96 has an undeflected tangential width WG_u (FIG. 6) of between about four thousandths (0.004) inches and ten thousandths (0.010) inches, more preferably between about six thousandths (0.006) inches and eight thousandths (0.008) inches, and most preferably about seven thousandths (0.007) inches. In the deflected state of the given pole segment 46, however, the cutout gap 96 decreases in size so as to have a tangential width WG_d (FIG. 10) that is less than the undeflected tangential width WG_u. Most preferably, the cutout gap 96 closes nearly completely when the associated magnets 18 are in their final positions.

For proportional reference, it is noted that, in the undeflected state of the given pole segment 46, the cutout 56 has a maximum tangential width WC_u (FIG. 6) at the radially inner edge of the top or outer portion 56a (i.e. at the radially outer edge of the intermediate portion 56c) of between about fifty thousandths (0.050) inches and three hundred fifty thousandths (0.350) inches, more preferably between about one hundred thousandths (0.100) inches and three hundred thousandths (0.300) inches, and most preferably about two hundred eighteen thousandths (0.218) inches.

Although each cutout 56 is necessary to facilitate deflection of the associated prongs 54a and 54b, it is noted that the cutout 56 should be sized and shaped to result in zero, minimal, or at least acceptable detrimental flux flow effects while also facilitating sufficient deflection. For instance, too large a cutout might lead to poor flux characteristics of the associated pole segment, while too small a cutout might lead to insufficiently deflectable prongs.

As noted previously, the prongs 54a and 54b apply clamping forces to the magnets 18. In the illustrated embodiment, a clamping force of between about fifty (50) lb and about two hundred (200) lb is preferred. More preferably, the clamping force is between about seventy-five (75) lb and about one hundred fifty (150) lb. Most preferably, the clamping force is between about one hundred ten (110) and about one hundred twenty-five (125) lb.

As will be apparent from the above, the aforementioned radial force required to initially radially shift a given one of the magnets 18 is preferably variable over the course of insertion. However, in a broad sense, such radial force in the illustrated embodiment is preferably between about five (5) lb and about forty-five (45) lb. More preferably, the radial insertion force is between about fifteen (15) lb and about thirty-five (35) lb. Most preferably, the radial insertion force is between about twenty-two (22) lb and about thirty (30) lb.

Likewise, it will therefore be understood by those of ordinary skill in the art that the final friction force is most preferably between about five (5) lb and about forty-five (45) lb. More preferably, the final friction force is between about fifteen (15) lb and about thirty-five (35) lb. Most preferably, the final friction force is between about twenty-two (22) lb and about thirty (30) lb.

Preferably, the first and second prongs 54a and 54b of each pole segment 46 experience a peak stress during and after the course of assembly that is less than the yield strength of the rotor core material or, if plastic deformation is necessary to accommodate tolerances, only slightly more than the yield strength of the rotor core material. In a preferred embodiment featuring a steel core 16, for instance, the peak stress experienced by the first and second prongs 54a and 54b of each pole segment 46 during and after the course of assembly is preferably less than five hundred (500) MPa.

Second Embodiment: Concave and Convex Pole Segment Surfaces

A second preferred embodiment of the rotor is illustrated in FIG. 11a and is contrasted with FIG. 11b, which provides an exaggerated illustration of an undesirable arrangement of the first preferred embodiment described above. It is initially noted that, with certain exceptions to be discussed in detail below, many of the elements of the rotor 110 of the second embodiment are the same as or very similar to those described in detail above in relation to the rotor 12 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

The rotor 110 is preferably configured identically to the rotor 12 except in this shaping of certain surfaces of the pole segments thereof. In particular, in a highly exaggerated manner, FIG. 11a illustrates a pair of pole segments 112 and a magnet 114 disposed arcuately between the pole segments 112 in a slot 116. The pole segments each include prongs 118a and 118b. In a likewise highly exaggerated manner, FIG. 11b illustrates a pair of the prongs 54a and 54b and a magnet 18 received therebetween in a slot 48.

The prong 118a in FIG. 11a is shaped in a generally concave manner so as to contact the magnet 114 at two (2) contact points or regions 120 and be spaced from the magnet 114 in an intermediate non-contact region 122.

Conversely, the prong 118b in FIG. 11 is a shaped in a generally convex manner so as to contact the magnet 114 at a single contact point or region 120 at an intermediate location and be spaced from the magnet 114 in two (2) radially spaced apart non-contact regions 122.

Thus, stable (i.e., secure and effective) three (3)-point contact is achieved between the prongs 118a, 118b and the magnet 114.

In contrast, the highly exaggerated straight-sided prong configuration of FIG. 11b involves less than desirable circumstances that might occur with the first embodiment. More particularly, a combination of imperfect tolerances, the straight-sided magnet and prong geometries, and the deformation progress of the prongs 54a and 54b could lead to only two (2)-point contact occurring between the magnet 18 and the prongs 54a and 54b (i.e., at contact points P). Such contact is potentially unstable, allowing for potential pivoting at a radially inner end of the magnet 18 (see illustrative arrows) and potentially other forms of shifting and/or slippage.

That is, although continuous overlying engagement of straight-sided prongs against straight-sided magnets is intended, the presence of any imperfections (i.e., even within prescribed manufacturing tolerances) might lead to non-continuous engagement. Provision of opposed concave and convex pole segment surfaces on opposite arcuate sides of a straight-sided magnet enables stable three (3)-point contact to be achieved regardless of manufacturing tolerances.

As will be readily apparent to those of ordinary skill in the art, numerous variations to the above concept might be made without departing from the scope of some aspects of the present invention. For instance, the magnets might be provided with concave and convex surfaces while the pole segment sides are straight, etc.

Third Embodiment: Radially Outer Magnet Insertion

A third preferred embodiment of the rotor is illustrated in FIGS. 12 and 13. It is initially noted that, with certain exceptions to be discussed in detail below, many of the elements of the rotor 210 of the third embodiment are the same as or very similar to those described in detail above in relation to the rotor 12 of the first embodiment and the rotor 110 of the second embodiment. Therefore, for the sake of brevity and clarity, redundant descriptions and numbering will be generally avoided here. Unless otherwise specified, the detailed descriptions of the elements presented above with respect to the first and second embodiments should therefore be understood to apply at least generally to the third embodiment, as well.

Similarly to the rotor 12 and the rotor 110, the rotor 210 includes a core 212, a plurality of magnets 214, and a shaft (not shown). The rotor core 212 preferably comprises a plurality of pole segments or spokes 216 arranged arcuately about the rotor axis. Similarly, the magnets 18 are preferably arranged arcuately about the rotor axis. In a preferred embodiment, as illustrated, the pole segments 216 alternate arcuately with the magnets 214, such that each of the magnets 214 is at least in part interposed between adjacent pole segments 216.

The rotor core 212 further preferably includes a radially inner hub or support structure 218. The pole segments 216 preferably extend radially outwardly relative the hub 218 and are integrally formed therewith. More particularly, the pole segments 216 include stems 220 integrally connected to the hub 218.

Preferably, the pole segments 216 are evenly arcuately arranged. Similarly, the magnets 214 are preferably evenly arcuately arranged. Yet further, each magnet 214 is preferably centrally positioned between adjacent pole segments 216. Each magnet 214 is also preferably in direct contact with adjacent ones of the pole segments 216. It is permissible according to some aspects of the present invention, however, for uneven arrangements or variably spaced arrangements to be used.

Each pole segment 216 preferably includes a radially outer connector or bridge 222 and a pair of arcuately spaced apart prongs or legs 224 and 226 extending radially inwardly from arcuately opposed ends of the bridge 222. A first one of the legs 224 extends continuously with the corresponding stem 220, while the second one of the legs 226 presents a radially inner end 228 that is spaced radially from the hub 218.

A cutout 230 is thus formed between the legs 224 and 226 of a given pole segment 216.

Similar to the slots 48 of the first preferred embodiment, magnet-receiving slots 232 are formed between adjacent ones of the pole segments 216. The magnets 214 are received within the slots 232.

In an undeflected state (not shown), the slots 232 present a greater tangential width at an outermost edge thereof than at an innermost edge thereof. That is, the slots 232 taper radially inwardly in the undeflected state.

In view of this inward tapering, in a preferred method of assembly, the magnets 214 are inserted into the slots 232 in a radially inward direction. More particularly, the magnets 214 are initially inserted into the wider outer portion of each corresponding slot 232. The magnets 214 are then forced radially inward so as to deflect the corresponding second prongs or legs 226 toward the corresponding legs 224, thereby widening the radially inner portions of the slots 232 to match the width of the given magnet 214. That is, deflection of each second leg 226 inwardly into the corresponding cutout 230 accommodates the corresponding magnet 214.

The second prong or leg 226 is thus subjected to stress and consequently, in collaboration with the first leg 224 of the adjacent pole segment 216, applies a generally tangential clamping force onto the magnet 214. This clamping force is preferably great enough to restrict both radial and axial shifting of the given magnet 214.

Preferably, to facilitate insertion of the magnets 214 from a radially outer position, ears or tabs like the ears or tabs 68a and 68ab of the first preferred embodiment are omitted. However, such features may be included without departing from the scope of the present invention and, in a design similar to that of the rotor 210, might be associated with an alternative axial first, radial second magnet insertion technique.

CONCLUSION

As will be readily apparent to those of ordinary skill in the art, the above-described invention enables securement of magnets within a rotor core without (or with significantly reduced) use of additional parts and/or adhesives, reducing both unit cost and capital cost. Securement is also achieved without increasing the size of the rotor. Furthermore, the invention both retains the magnets and minimizes air gaps in the desired magnetic flux path, thus aiding in motor performance. It is also noted that special dies are not required for production of the rotor core.

Features of one or more embodiments described above may be used in various combinations with each other and/or may be used independently of one another. For instance, although a single disclosed embodiment may include a preferred combination of features, it is within the scope of certain aspects of the present invention for the embodiment to include only one (1) or less than all of the disclosed features, unless the specification expressly states otherwise or as might be understood by one of ordinary skill in the art. Therefore, embodiments of the present invention are not necessarily limited to the combination(s) of features described above.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A rotor for use in an electric motor and rotatable about an axis, said rotor comprising:
   a plurality of magnets; and
   a core including a plurality of pole segments arranged arcuately about the axis,
   each of said pole segments including first and second prongs that extend along a direction away from the axis and are at least in part arcuately spaced apart to define an open cutout therebetween,
   each pair of arcuately adjacent pole segments defining therebetween a respective magnet-receiving slot, with the first prong of one of the pole segments and the second prong of the other of said pole segments defining the magnet-receiving slot,
   said magnets being received in the magnet-receiving slots, such that each of the magnets is at least in part interposed between one of the pairs of adjacent pole segments,
   said magnets and said pole segments being dimensioned and configured so that at least one of the first and second prongs is deflected into the open cutout by the magnet received in the respective magnet-receiving slot, such that the prongs cooperatively apply a clamping force on the magnet,
   said first and second prongs of each of said pole segments presenting respective radially outer prong faces,
   said open cutout including a gap separating the respective radially outer prong faces.

2. The rotor of claim 1,
   said clamping force being at least substantially tangential.

3. The rotor of claim 2,
   said clamping force being greater than 50 lb.

4. The rotor of claim 1
   at least one of said first and second prongs being elastically deflected by the magnet received in the respective magnet-receiving slot.

5. The rotor of claim 4,
   said first and second prongs each experiencing a peak stress of less than 500 MPa.

6. The rotor of claim 1,
   said first and second prongs of each of said pole segments cooperatively presenting axially opposed top and bottom faces of the respective pole segment,
   said first prong presenting a first outer side face of the pole segment,
   said second prong presenting a second outer side face of the pole segment, arcuately spaced from the first outer side face,
   said first and second outer side faces each extending between and interconnecting the top and bottom faces.

7. The rotor of claim 1
   said first and second prongs of each of said pole segments cooperatively defining a radial margin of the rotor core,
   each of said cutouts extending to the radial margin.

8. The rotor of claim 7,
   each of said cutouts configured to have a first tangential width at the margin when the prongs are in the undeflected state and a second tangential width at the margin when at least one of the prongs is in the deflected state,
   said second tangential width being less than the first tangential width.

9. The rotor of claim 8,
   at least one of said prongs configured to shift from an undeflected state to a deflected state during rotor assembly as said magnets are positioned in said slots,
   each of said open cutouts configured to accommodate such deflection by varying in tangential width.

10. The rotor of claim 1
    said clamping force resulting in a friction force between said first and second prongs and the magnet,
    said friction force being between 5 lb and 45 lb.

11. A rotor for use in an electric motor and rotatable about an axis, said rotor comprising:
    a plurality of magnets; and
    a core including a plurality of pole segments arranged arcuately about the axis,
    each of said pole segments including first and second prongs that extend along a direction away from the axis to present respective radially outer prong faces,
    said radially outer prong faces at least in part cooperatively defining a radially outer margin of the rotor core,
    said first and second prongs of each pole segment being at least in part arcuately spaced apart to define a cutout therebetween,
    said cutout including a gap defined at the margin and separating the respective radially outer prong faces,
    each pair of arcuately adjacent pole segments defining therebetween a respective magnet-receiving slot, with the first prong of one of the pole segments and the second prong of the other of said pole segments defining the magnet-receiving slot,
    said magnets being received in the magnet-receiving slots, such that each of the magnets is at least in part interposed between one of the pairs of adjacent pole segments,
    said magnets and said pole segments being dimensioned and configured so that at least one of the first and second prongs is deflected by the magnet received in the respective magnet-receiving slot, such that the prongs cooperatively apply a clamping force on the magnet.

12. The rotor of claim 11,
    each of said cutouts configured to have a first tangential width at the gap when the prongs are in the undeflected state and a second tangential width at the gap when at least one of the prongs is in the deflected state,
    said second tangential width being less than the first tangential width.

13. The rotor of claim 11,
    at least one of said first and second prongs being elastically deflected by the magnet received in the respective magnet-receiving slot.

14. The rotor of claim 11,
    said clamping force being at least substantially tangential.

15. The rotor of claim 14,
    said clamping force being greater than 50 lb.

16. The rotor of claim 11,
    at least one of said first and second prongs configured to shift from an undeflected state to a deflected state during rotor assembly as said magnets are positioned in said slots,
    each of said cutouts configured to accommodate such deflection by varying in tangential width.

17. The rotor of claim 11,
each of said prongs including—
- a generally radially extending neck having a radially outer end, and
- an enlarged head extending from the radially outer end of the neck,
- said head presenting the respective radially outer prong face.

18. The rotor of claim 11,
said first and second prongs of each of said pole segments cooperatively presenting axially opposed top and bottom faces of the respective pole segment,
said first prong presenting a first outer side face of the pole segment,
said second prong presenting a second outer side face of the pole segment, arcuately spaced from the first outer side face,
said first and second outer side faces each extending between and interconnecting the top and bottom faces.

* * * * *